United States Patent
Kato et al.

(10) Patent No.: US 9,929,828 B2
(45) Date of Patent: Mar. 27, 2018

(54) OPTICAL ADD/DROP MULTIPLEXER AND METHOD FOR ADDING/DROPPING OPTICAL SIGNAL

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 15/016,734

(22) Filed: Feb. 5, 2016

(65) Prior Publication Data

US 2016/0285582 A1    Sep. 29, 2016

(30) Foreign Application Priority Data

Mar. 26, 2015    (JP) ................ 2015-064993

(51) Int. Cl.
*H04B 10/08*    (2006.01)
*H04B 17/00*    (2015.01)
*H04J 14/02*    (2006.01)
*H04B 10/079*    (2013.01)
*H04B 10/077*    (2013.01)

(52) U.S. Cl.
CPC ...... *H04J 14/0298* (2013.01); *H04B 10/0775* (2013.01); *H04B 10/07957* (2013.01); *H04J 14/0201* (2013.01); *H04B 2210/078* (2013.01)

(58) Field of Classification Search
CPC ............... H04B 10/07953; H04B 10/00; H04J 14/0204; H04J 14/0217; H04J 14/028
USPC ........................................ 398/34, 83, 32, 82
See application file for complete search history.

(56) References Cited

U.S. PATENT DOCUMENTS

| | | | |
|---|---|---|---|
| 2004/0005150 A1* | 1/2004 | Takeshita ............... | H04B 10/00 398/32 |
| 2004/0190899 A1* | 9/2004 | Torii ................ | H04B 10/07953 398/33 |
| 2009/0067845 A1* | 3/2009 | Zhong ................ | H04J 14/0204 398/83 |
| 2009/0074418 A1* | 3/2009 | Levy .................... | H04J 14/021 398/83 |

(Continued)

FOREIGN PATENT DOCUMENTS

| | | |
|---|---|---|
| JP | 2011-109439 | 6/2011 |
| JP | 2012-119925 | 6/2012 |

*Primary Examiner* — David Payne
*Assistant Examiner* — Pranesh Barua
(74) *Attorney, Agent, or Firm* — Fujitsu Patent Center

(57) ABSTRACT

OADM processes input light containing reference light and multiplexed optical signals. A splitter splits the input light to generate first and second input light. A receiver generates an electric signal representing the second input light. An estimator estimates a difference in optical frequency between the reference light and a specified optical signal based on the electric signal. A light source generates first and second light. An optical frequency of the second light is shifted by the estimated difference with respect to that of the first light. A demodulator generates a dropped signal representing the specified optical signal. A drive signal generator generates a drive signal in accordance with an inverted signal of the dropped signal. A modulator modulates the second light with the drive signal to generate a modulated optical signal. The first input light, the first light and the modulated optical signal are input to non-linear optical medium.

12 Claims, 13 Drawing Sheets

(56) References Cited

U.S. PATENT DOCUMENTS

| | | | |
|---|---|---|---|
| 2010/0129082 A1* | 5/2010 | Zhong | H04J 14/0204 398/83 |
| 2012/0275794 A1* | 11/2012 | Melamed | H04J 14/0204 398/83 |
| 2013/0223837 A1* | 8/2013 | Zhang | H04J 14/0202 398/7 |
| 2016/0373206 A1* | 12/2016 | Tanimura | H04J 14/0202 |
| 2017/0307957 A1* | 10/2017 | Kato | H04B 10/548 |

* cited by examiner

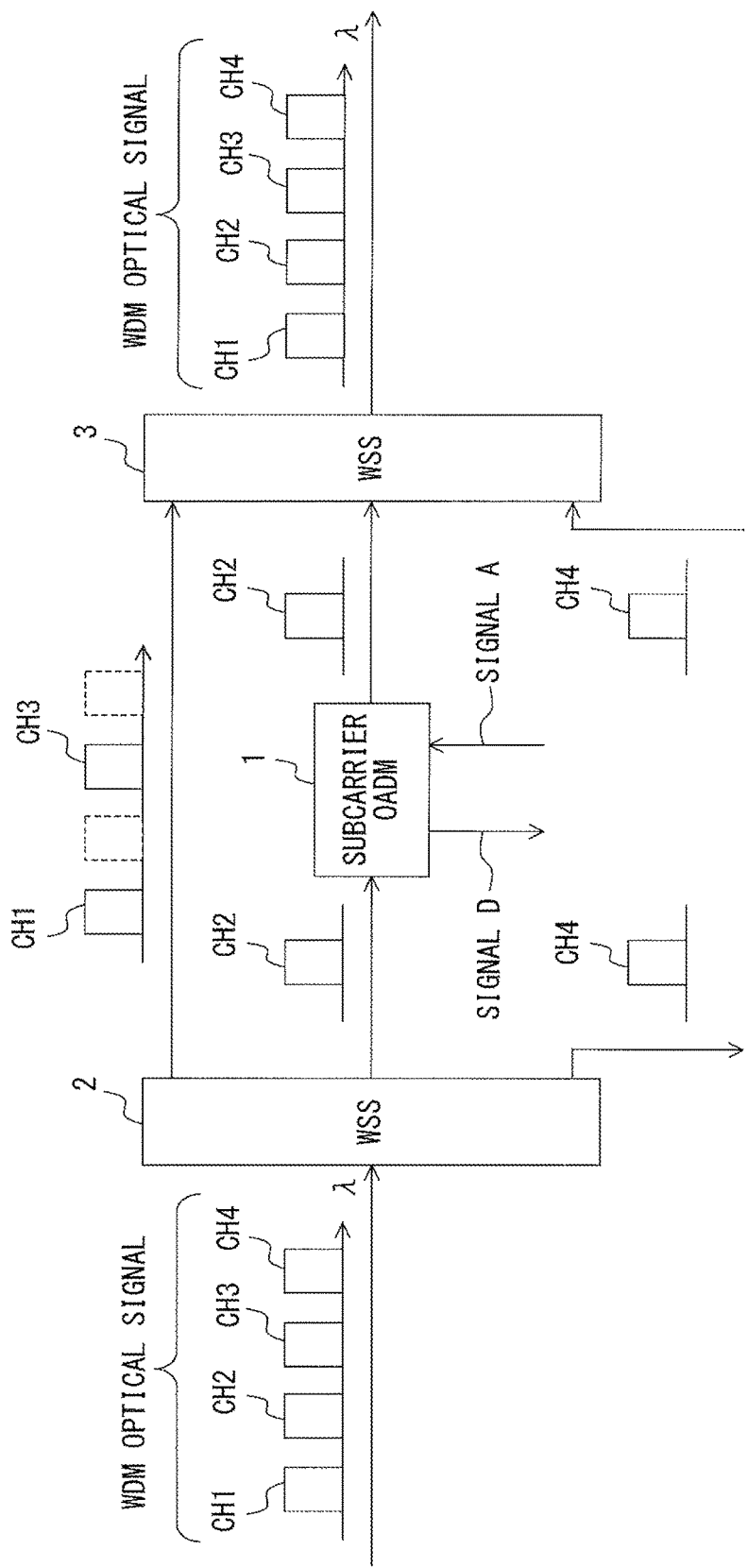
F I G. 4

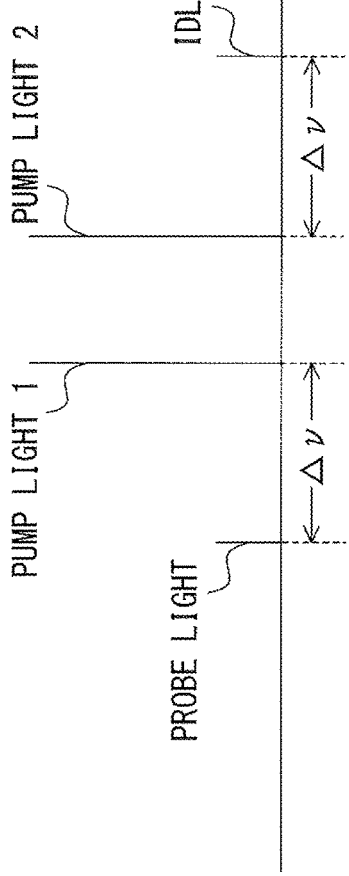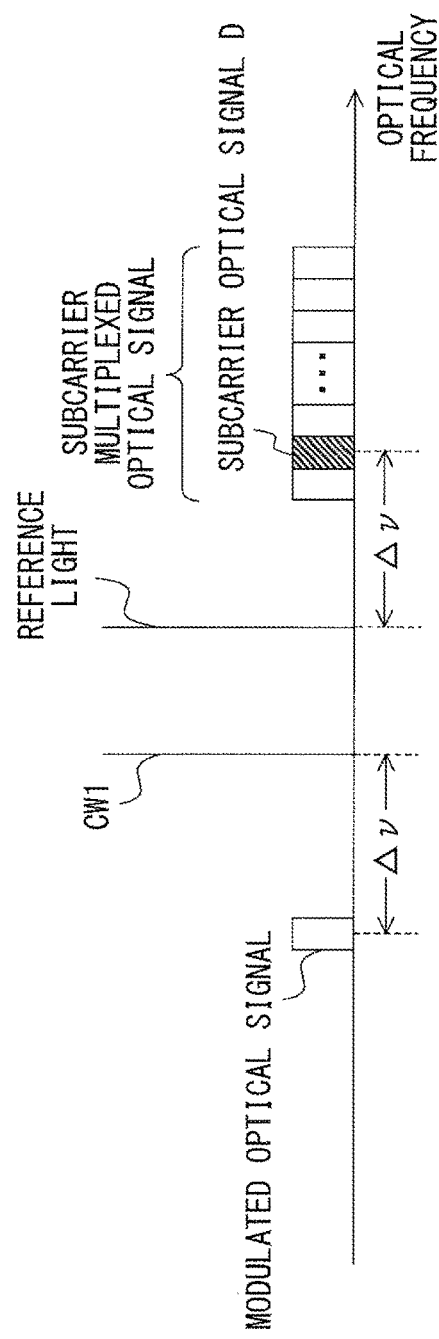
FIG. 8A
FIG. 8B

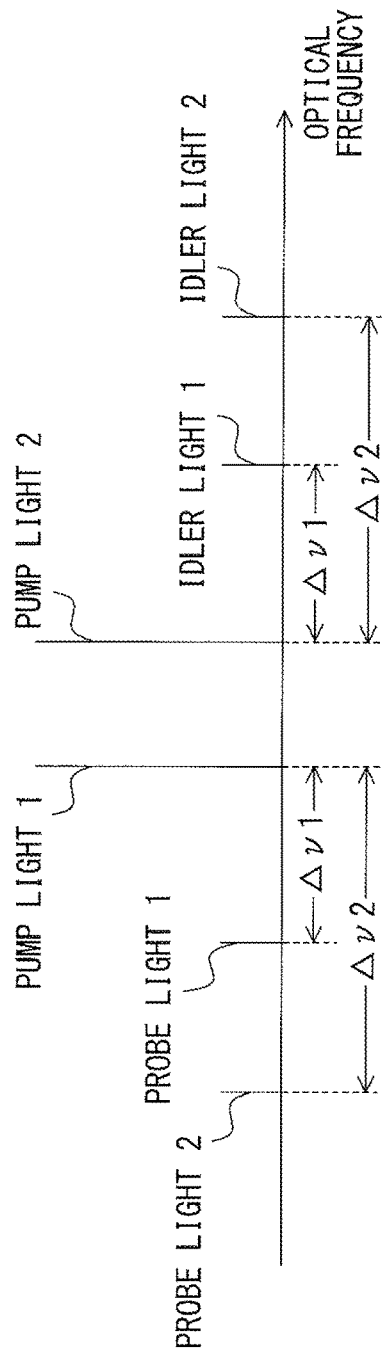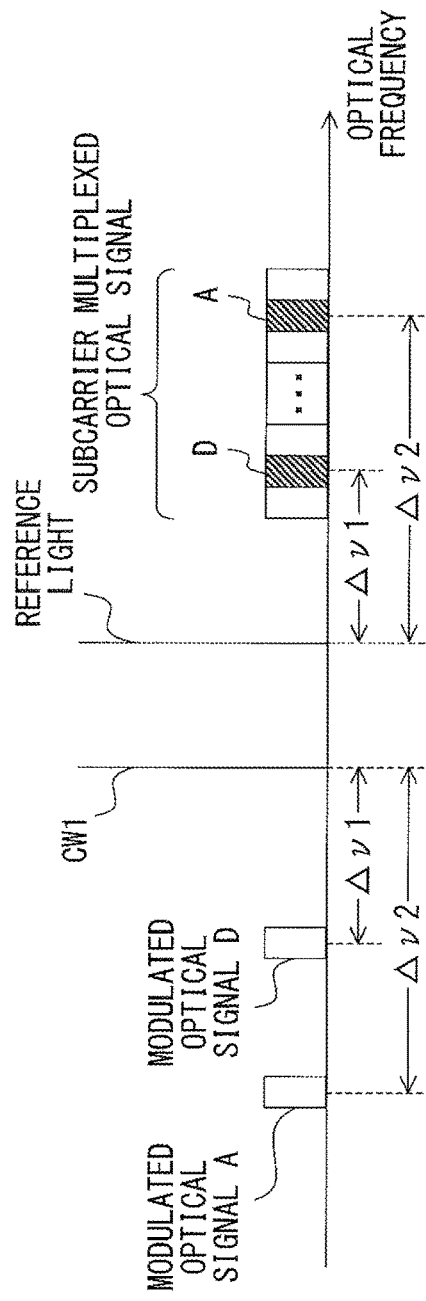
FIG. 11A
FIG. 11B

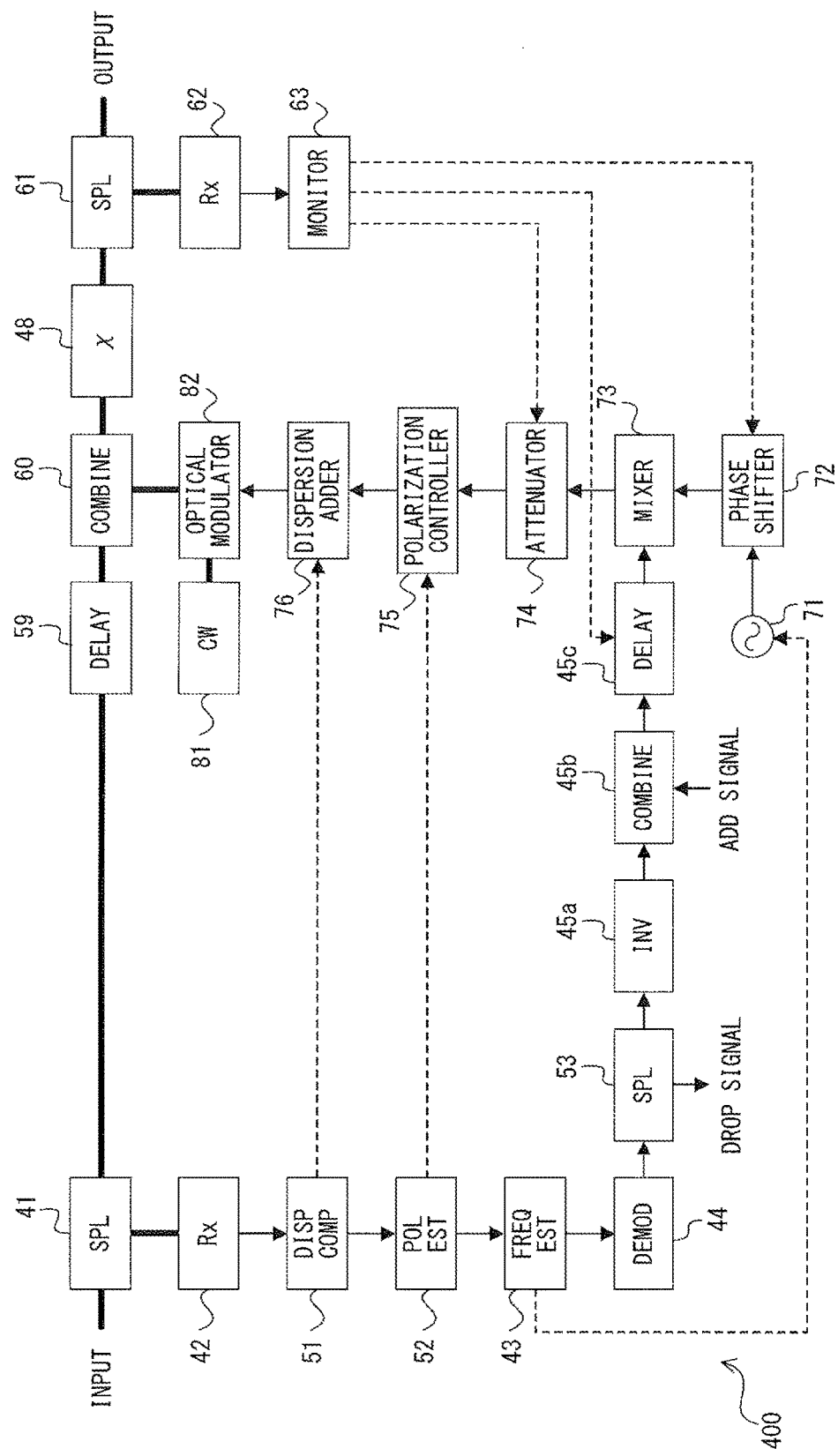
F I G. 1 3

OPTICAL ADD/DROP MULTIPLEXER AND METHOD FOR ADDING/DROPPING OPTICAL SIGNAL

CROSS-REFERENCE TO RELATED APPLICATION

This application is based upon and claims the benefit of priority of the prior Japanese Patent Application No. 2015-064993, filed on Mar. 26, 2015, the entire contents of which are incorporated herein by reference.

FIELD

The embodiments discussed herein are related to an optical add/drop multiplexer and a method for adding/dropping an optical signal.

BACKGROUND

In recent years, reconfigurable optical add/drop multiplexers (ROADMs) have been put into practical use in order to implement a flexible optical network with a large capacity. A ROADM is provided in for example each node of a WDM transmission system. A ROADM can drop an optical signal of a desired wavelength channel from a received WDM optical signal so as to guide it to a client device. In addition, a ROADM can add a data signal received from a client device to a WDM optical signal.

In order to implement the above operations, a ROADM includes a wavelength selective switch. A wavelength selective switch includes for example an array waveguide grating, a micro machine, a liquid crystal element, etc.

Reconfigurable optical add/drop multiplexers are described in for example Japanese Laid-open Patent Publication No. 2012-119925 and Japanese Laid-open Patent Publication No. 2011-109439.

In order to further increase the capacity of optical networks and/or to increase the flexibility of optical networks, methods that use communication resources (wavelength or frequency in this case) more efficiently are discussed. As an example, a multicarrier modulation that multiplexes a plurality of subcarrier optical signals is discussed. As one scheme for multicarrier modulation, for example orthogonal frequency division multiplexing (OFDM) has been used practically. In the descriptions below, an optical signal in which a plurality of subcarrier optical signals are multiplexed may be referred to as a "subcarrier multiplexed optical signal".

In order to transmit an arbitrary subcarrier optical signal included in a subcarrier multiplexed optical signal, a technique of processing a wavelength with very small granularity may be requested. However, it is difficult to implement a wavelength selective switch having a steep transmission characteristic. In other words, according to the conventional techniques, it is not easy to process separately each subcarrier optical signal included in a subcarrier multiplexed optical signal. Accordingly, it is difficult for the conventional techniques to narrow sufficiently the wavelength spacing (or the frequency spacing) in a channel/subchannel of an optical network. Note that it is assumed in the descriptions below that a subcarrier multiplexed optical signal belongs to a wavelength-division multiplexed optical signal.

SUMMARY

According to an aspect of the invention, an optical add/drop multiplexer processes wavelength multiplexed light containing reference light and a wavelength-division multiplexed optical signal in which a plurality of optical signals are multiplexed. The optical add/drop multiplexer includes: an optical splitter that splits the wavelength multiplexed light to generate first wavelength multiplexed light and second wavelength multiplexed light; a receiver that generates an electric signal representing the second wavelength multiplexed light; a frequency estimator that estimates a difference in optical frequency between the reference light and an optical signal specified from among the plurality of optical signals multiplexed in the wavelength-division multiplexed optical signal, based on the electric signal generated by the receiver; a light source that generates first light and second light, an optical frequency of the second light being shifted by the estimated difference with respect to an optical frequency of the first light; a demodulator that generates a dropped signal representing the specified optical signal based on the electric signal; a drive signal generator that generates a drive signal in accordance with an inverted signal of the dropped signal and an added signal; an optical modulator that modulates the second light in accordance with the drive signal to generate a modulated optical signal; and a non-linear optical medium to which the first wavelength multiplexed light, the first light and the modulated optical signal are input.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a different example of an optical add/drop multiplexer;

FIGS. 8A and 8B explain a non-linear effect according to the first embodiment;

FIGS. 11A and 11B explain a non-linear effect according to the second embodiment;

FIG. 13 illustrates an example of an optical add/drop multiplexer according to a fourth embodiment.

DESCRIPTION OF EMBODIMENTS

Figure 1:
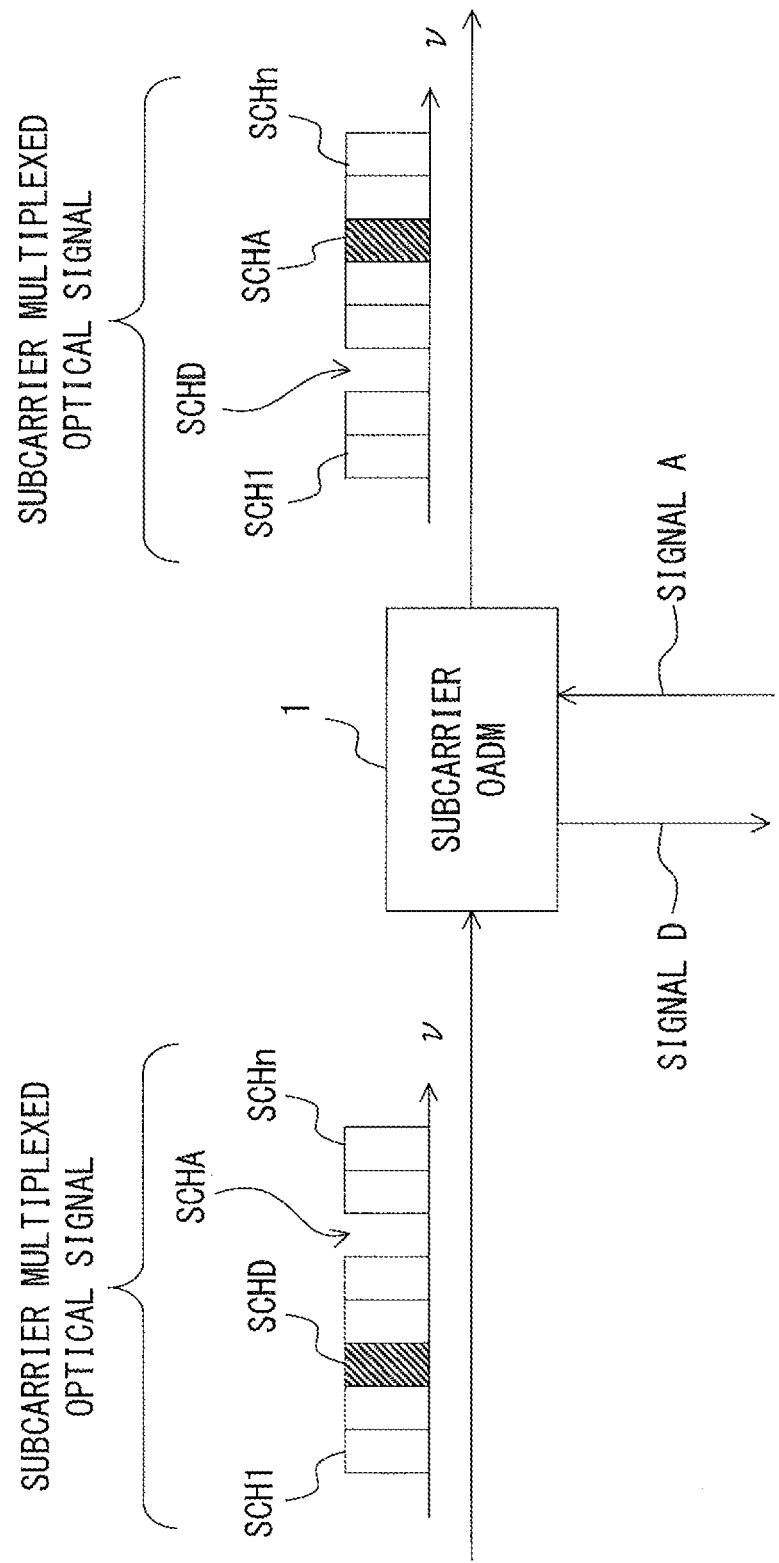
FIG. 1 illustrates an example of an optical add/drop multiplexer.

FIG. 1 illustrates an example of an optical add/drop multiplexer according to an embodiment of the present invention. An optical add/drop multiplexer (OADM) according to an embodiment processes a subcarrier multiplexed optical signal in which a plurality of subchannels are multiplexed. In other words, the optical add/drop multiplexer according to the embodiment processes a subcarrier multiplexed optical signal in which a plurality of subcarrier optical signals are multiplexed. Accordingly, an optical add/drop multiplexer of the embodiment may be referred to as a "subcarrier optical add/drop multiplexer (subcarrier OADM)" in the explanations below.

To a subcarrier OADM 1, a subcarrier multiplexed optical signal in which a plurality of subcarrier optical signals are multiplexed is input. The subcarrier OADM 1 can drop a specified subcarrier optical signal from a subcarrier multiplexed optical signal. In the example illustrated in FIG. 1, the subcarrier OADM 1 drops subcarrier optical signal D that is allocated to subchannel SCHD from the subcarrier multiplexed optical signal. Note that subcarrier optical signal D dropped from the subcarrier multiplexed optical signal is guided to for example a client device. Also, the subcarrier OADM 1 can add a subcarrier optical signal to a subcarrier multiplexed optical signal. In the example illustrated in FIG. 1, the subcarrier OADM 1 adds subcarrier optical signal A to a subchannel SCHA of the subcarrier multiplexed optical signal. Subcarrier optical signal A added to the subcarrier multiplexed optical signal is generated by for example a client device.

In the above optical add/drop process, when a subcarrier optical signal has been dropped from a subcarrier multiplexed optical signal, a new subcarrier optical signal can be added to the subchannel of the dropped subcarrier optical signal. However, when a component of the dropped subcarrier optical signal remains in the subchannel, the quality of the newly-added subcarrier optical signal deteriorates. Accordingly, when a subcarrier optical signal is dropped from a subcarrier multiplexed optical signal, it is desirable to remove the subcarrier optical signal from the subcarrier multiplexed optical signal highly accurately.

Figure 2:
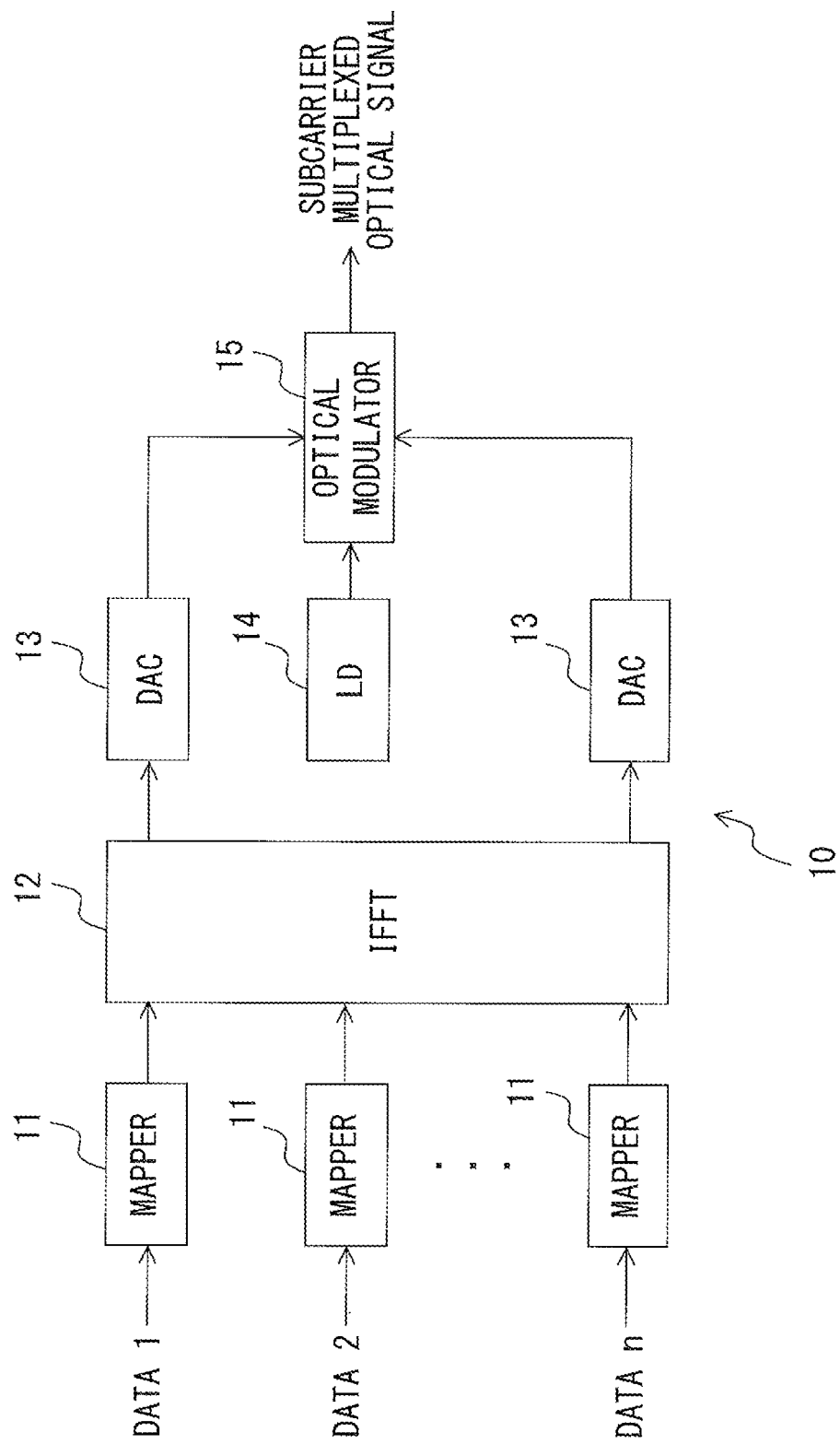
FIG. 2 illustrates an example of an optical transmitter that generates a subcarrier multiplexed optical signal.

FIG. 2 illustrates an example of an optical transmitter that generates a subcarrier multiplexed optical signal. In this example, a subcarrier multiplexed optical signal is generated by using OFDM.

An optical transmitter 10 includes mappers 11-1 through 11-*n*, an inverse FFT (Fast Fourier Transform) circuit 12, a D/A (Digital-to Analog) convertor 13, a laser light source 14 and an optical modulator 15. The mappers 11-1 through 11-*n* respectively map data signals 1 through n into constellation in accordance with the modulation schemes. The inverse FFT circuit 12 generates a time domain signal by performing inverse FFT on signals output from the mappers 11-1 through 11-*n*. The D/A convertor 13 generates a drive signal by performing D/A conversion on a signal output from the inverse FFT circuit 12. The laser light source 14 generates continuous wave light of a specified optical frequency. The optical modulator 15 modulates the continuous wave light output from the laser light source 14 with the drive signal to generate an optical signal.

A subcarrier multiplexed optical signal that transmits data signals 1 through n is generated by the optical transmitter 10. Note that data signals 1-*n* are respectively transmitted by subcarriers SC1-SCn.

Figure 3:
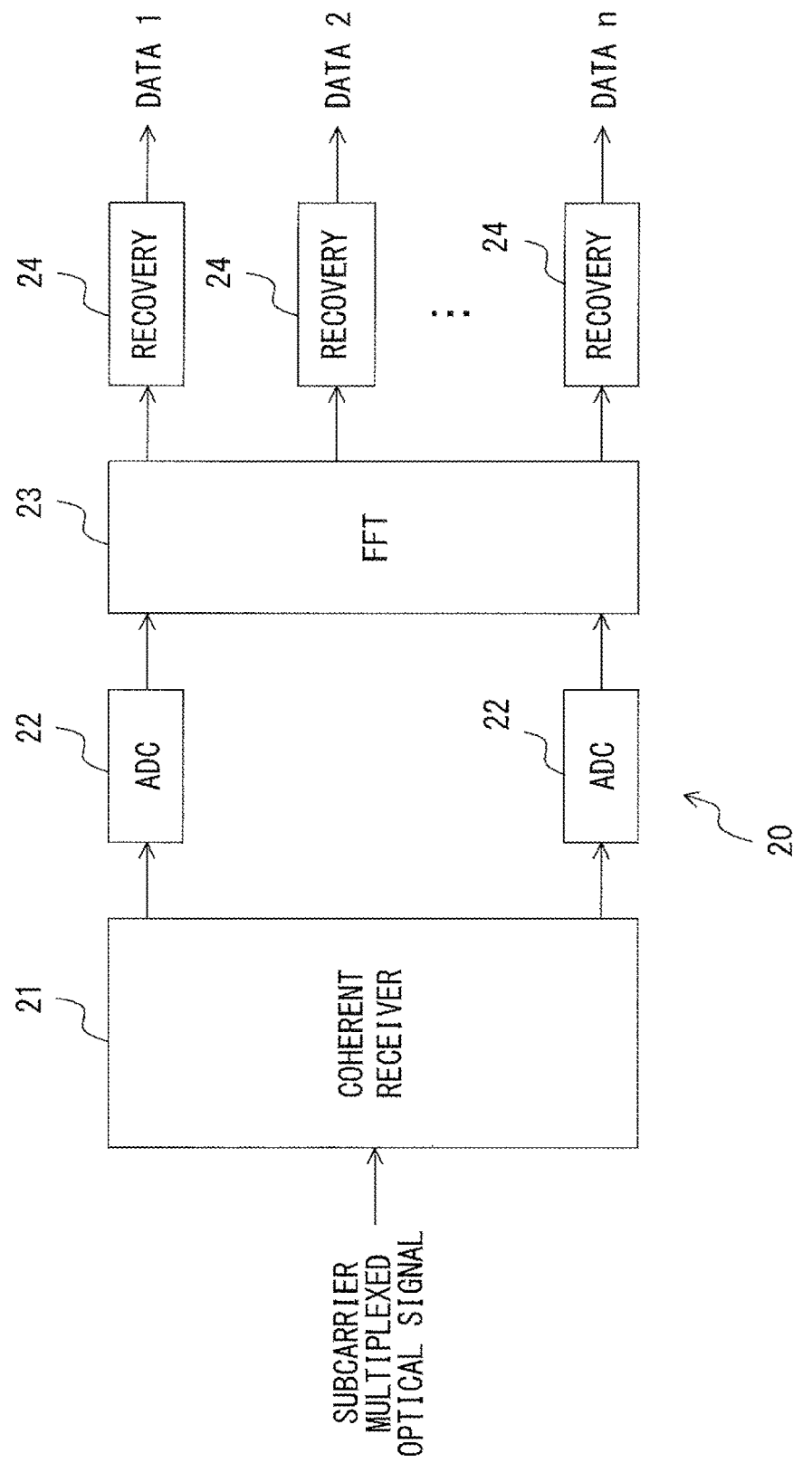
FIG. 3 illustrates an example of an optical receiver that receives a subcarrier multiplexed optical signal.

FIG. 3 illustrates an example of an optical receiver that receives a subcarrier multiplexed optical signal. A subcarrier multiplexed optical signal is generated by for example the optical transmitter 10 illustrated in FIG. 2.

As illustrated in FIG. 3, an optical receiver 20 includes a coherent receiver 21, an A/D (Analog-to-Digital) convertor 22, an FFT circuit 23 and recoveries 24-1 through 24-*n*. The coherent receiver 21 generates an electric signal representing the electric field information of a subcarrier multiplexed optical signal. The A/D convertor 22 converts the electric signal output from the coherent receiver 21 into a digital signal. The FFT circuit 23 generates a frequency domain signal by performing FFT on the digital signal representing the electric field information of the subcarrier multiplexed optical signal. The recoveries 24-1 through 24-*n* recovers the data signals 1 through n from the frequency domain signal output from the FFT circuit 23.

FIG. 4 illustrates a different example of an optical add/drop multiplexer according to an embodiment of the present invention. The optical add/drop multiplexer illustrated in FIG. 4 processes a WDM optical signal. In this example, wavelength channels CH1-CH4 have been multiplexed in the WDM optical signal. Each wavelength channel transmits a subcarrier multiplexed optical signal. In other words, the WDM optical signal includes a plurality of subcarrier multiplexed optical signal. A subcarrier multiplexed optical signal transmitted in each wavelength channel is generated by for example the optical transmitter 10 illustrated in FIG. 2.

A wavelength selective switch (WSS) 2 processes a received WDM optical signal. In the example illustrated in FIG. 4, the WSS 2 guides wavelength channel CH2 to the subcarrier OADM 1, guides wavelength channels CH1 and CH3 to a WSS 3, and guides wavelength channel CH4 to a client device. The subcarrier OADM 1 processes a subcarrier multiplexed optical signal transmitted in wavelength channel CH2. The WSS 3 multiplexes wavelength channel CH2 processed by the subcarrier OADM 1, wavelength channels CH1 and CH3 guided from the WSS 2 and wavelength CH4 guided from a client device so as to generate an output WDM optical signal.

Note that a plurality of subcarrier optical signals are multiplexed in a subcarrier multiplexed optical signal. The plurality of subcarrier optical signals multiplexed in the subcarrier multiplexed optical signal have different optical frequencies. Therefore, "subcarrier multiplexed optical signal" is an example of a wavelength-division multiplexed optical signal.

Figure 5:
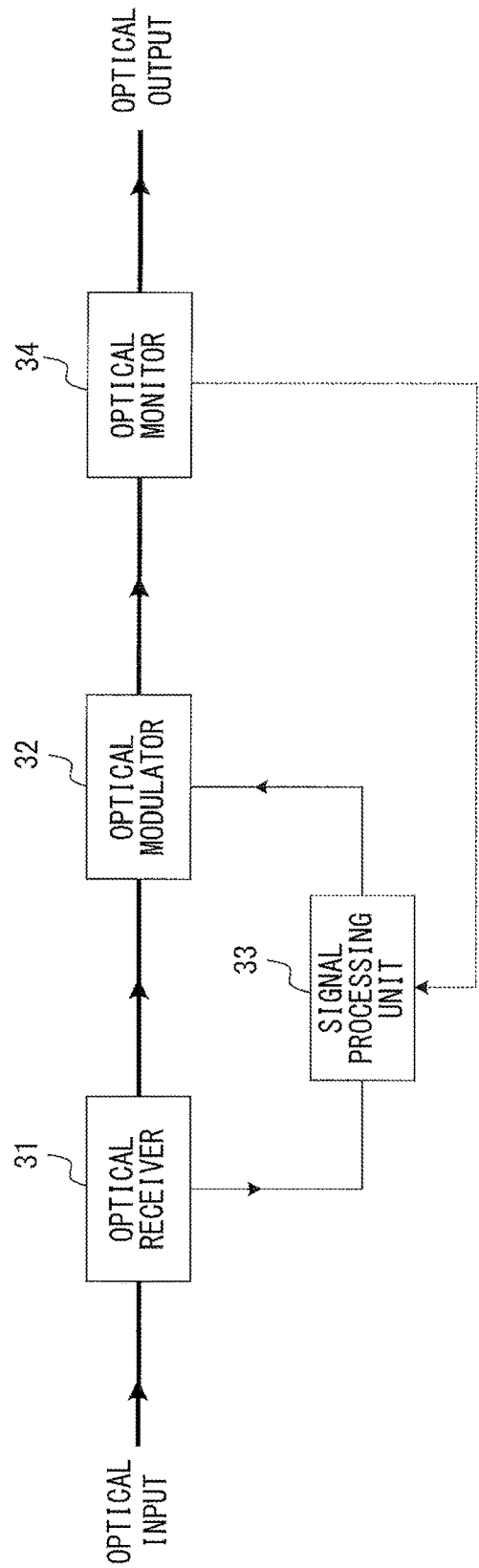
FIG. 5 illustrates an example of the function of an optical add/drop multiplexer.

FIG. 5 illustrates an example of the function of an optical add/drop multiplexer according to an embodiment of the present invention. The optical add/drop multiplexer illustrated in FIG. 5 is used as for example the subcarrier OADM 1 illustrated in FIG. 1 or FIG. 4.

The optical add/drop multiplexer includes an optical receiver 31, an optical modulator 32, a signal processing unit 33 and an optical monitor 34. A subcarrier multiplexed optical signal is input to this optical add/drop multiplexer. In the descriptions below, it is assumed that subcarrier optical signal SCD is dropped from a subcarrier multiplexed optical signal and subcarrier optical signal SCA is added to the subcarrier multiplexed optical signal.

The optical receiver 31 guides a received subcarrier multiplexed optical signal to the optical modulator 32, and recovers data signals by demodulating each subcarrier optical signal multiplexed in that subcarrier multiplexed optical signal. Then, the optical receiver 31 guides the data signal recovered from subcarrier optical signal SCD to a client device. Also, the optical receiver 31 gives to the signal processing unit 33 information related to the optical frequency of the subcarrier optical signal SCD. The optical receiver 31 is implemented by for example the optical receiver 20 illustrated in FIG. 3.

The optical modulator 32 removes subcarrier optical signal SCD from the subcarrier multiplexed optical signal in accordance with the signal given from the signal processing unit 33. Also, the optical modulator 32 adds subcarrier optical signal SCA to the subcarrier multiplexed optical signal in accordance with the signal given from the signal processing unit 33. Note that subcarrier optical signal SCA may be added to the subchannel from which subcarrier optical signal SCD was removed and may also be added to a different subchannel.

Based on the information related to the optical frequency of subcarrier optical signal SCD and the result of monitoring conducted by the optical monitor 34, the signal processing unit 33 generates a signal for removing subcarrier optical signal SCD from the subcarrier multiplexed optical signal and a signal for adding subcarrier optical signal SCA to the subcarrier multiplexed optical signal. The optical monitor 34 monitors an optical signal output from the optical modulator 32 and gives the monitoring result to the signal processing unit 33. In addition, the optical monitor 34 controls the signal processing unit 33 based on an optical signal output from the optical modulator 32.

First Embodiment

Figure 6:
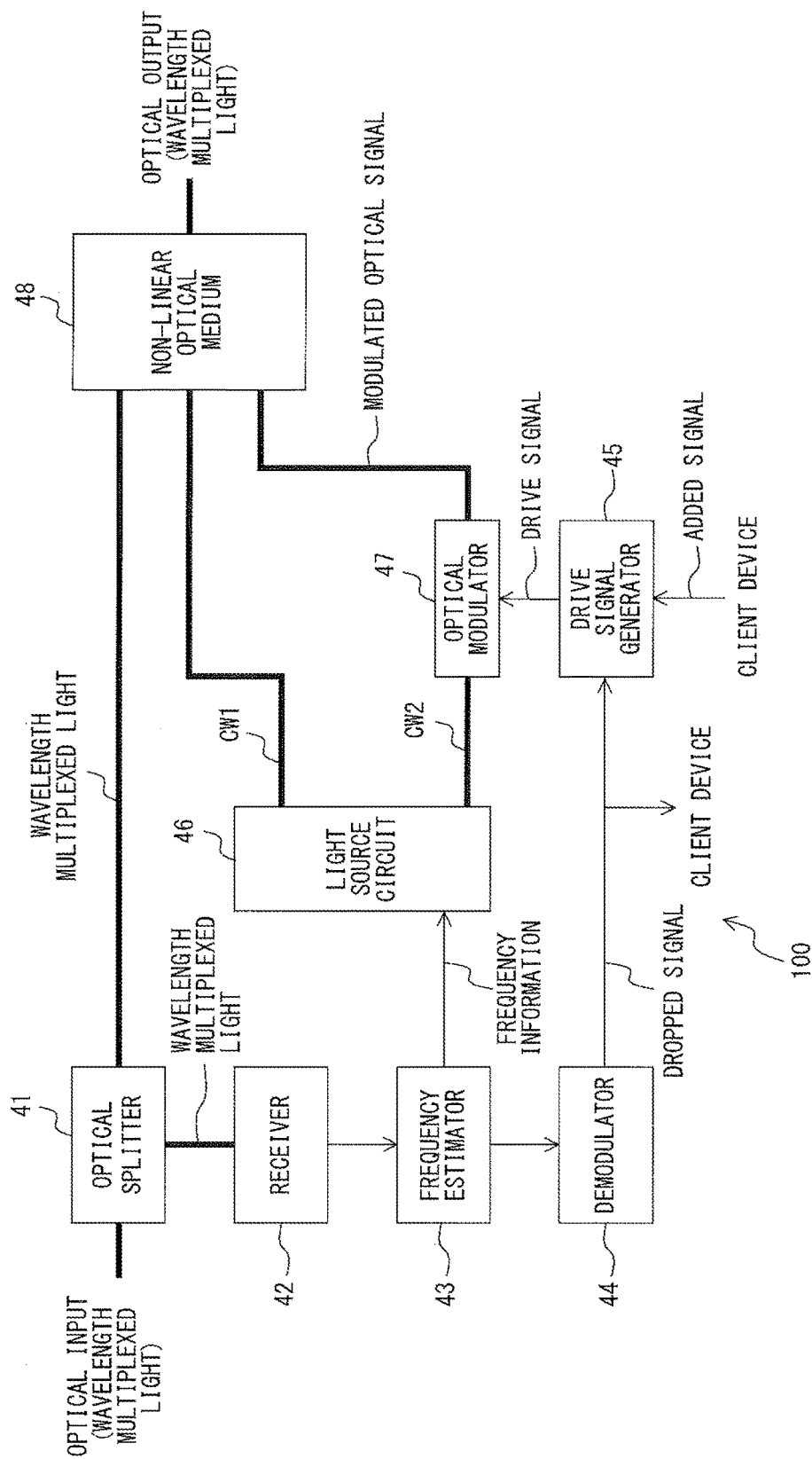
FIG. 6 illustrates an example of an optical add/drop multiplexer according to a first embodiment.

FIG. 6 illustrates an example of an optical add/drop multiplexer according to a first embodiment of the present invention. An optical add/drop multiplexer 100 according to the first embodiment includes, as illustrated in FIG. 6, an optical splitter 41, a receiver 42, a frequency estimator 43, a demodulator 44, a drive signal generator 45, a light source circuit 46, an optical modulator 47 and a non-linear optical medium 48.

Figure 7:
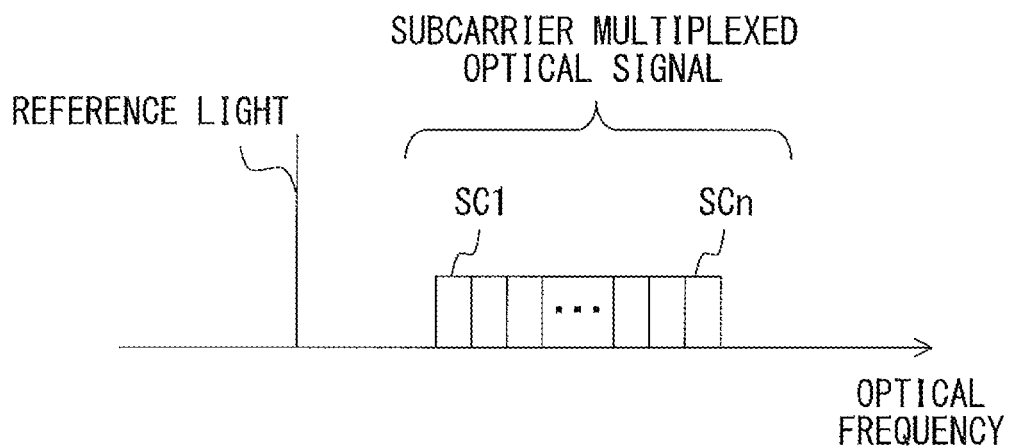
FIG. 7 illustrates an example of wavelength multiplexed light input to an optical add/drop multiplexer.

To the optical add/drop multiplexer 100, the wavelength multiplexed light illustrated in FIG. 7 is input. The wavelength multiplexed light contains a subcarrier multiplexed optical signal and reference light. In the subcarrier multiplexed optical signal, a plurality of subcarrier optical signals SC1-SCn are multiplexed. Phases of the plurality of subcarrier optical signals SC1-SCn are synchronized with each other. Also, the subcarrier multiplexed optical signal is generated by for example the optical transmitter 10 illustrated in FIG. 2. In such a case, since subcarrier multiplexed optical signals SC1-SCn are generated by modulating continuous wave light output from the laser light source 14, phases of the plurality of subcarrier optical signals are synchronized with each other.

The reference light has an optical frequency different from that of the subcarrier multiplexed optical signal. The optical frequency of the reference light may be lower than the optical frequency of the subcarrier multiplexed optical signal and may also be higher than the optical frequency of the subcarrier multiplexed optical signal. The difference in optical frequency between the reference light and the subcarrier multiplexed optical signal is not limited particularly. However, when the difference in optical frequency between the reference light and the subcarrier multiplexed optical signal is too small, it is difficult to separate the reference light and the subcarrier multiplexed optical signal in some cases. When the difference in optical frequency between the reference light and the subcarrier multiplexed optical signal is too large, the efficiency of the non-linear effect (such as for example four wave mixing, cross-phase modulation) deteriorates in the non-linear optical medium 48. Accordingly, it is desirable to take these factors into consideration when the difference in optical frequency between the reference light and the subcarrier multiplexed optical signal is determined.

It is desirable that the power of the reference light be higher than the power of each subcarrier optical signal as illustrated in FIG. 7. For example, it is desirable that the power of the reference light be high to cause a non-linear effect sufficiently in the non-linear optical medium 48. It is also desirable that a phase of the reference light is synchronized with a phase of the subcarrier multiplexed optical signal. Note that the reference light is for example continuous wave light.

The reference light is generated by for example an optical transmitter that transmits a subcarrier multiplexed optical signal. When a subcarrier multiplexed optical signal is generated by the optical transmitter 10 illustrated in FIG. 2, the reference light may also be generated by the optical transmitter 10. In such a case, a reference light source that generates reference light is provided to the optical transmitter 10 separately from the laser light source 14. In this configuration, the optical transmitter 10 may control the phase of at least one of the reference light and the light output from the laser light source 14 in such a manner that the phase the reference light and the phase of the light output from the laser light source 14 are synchronized. The optical transmitter 10 combines the subcarrier multiplexed optical signal and the reference light, and outputs the resultant signal to the optical transmission path.

The optical splitter 41 splits the received wavelength multiplexed light, and guides the resultant signals to the non-linear optical medium 48 and the receiver 42. Although the splitting ratio is not limited particularly, the optical splitter 41 splits the received wavelength multiplexed light in such a manner that for example the wavelength multiplexed light guided to the non-linear optical medium 48 has higher power than that of the wavelength multiplexed light guided to the receiver 42.

The receiver 42 generates an electric signal representing the wavelength multiplexed light guided from the optical splitter 41. The receiver 42 is implemented by for example the coherent receiver 21 and the A/D convertor 22 illustrated in FIG. 3. The receiver 42 may also include the FFT circuit 23 in addition to the coherent receiver 21 and the A/D convertor 22. In such a case, the coherent receiver 21 generates an electric signal representing the electric field information (I component and Q component) of the wavelength multiplexed light. Also, the FFT circuit 23 performs FFT on a digital signal representing the electric field information of the wavelength multiplexed light so as to a generate frequency domain signal. For example, a frequency domain signal representing the reference light and subcarrier optical signals are generated.

It is assumed that the optical add/drop multiplexer 100 receives an instruction to drop subcarrier optical signal SCD from a subcarrier multiplexed optical signal. Subcarrier optical signal SCD is one of a plurality of subcarrier optical signals SC1-SCn multiplexed in a subcarrier multiplexed optical signal.

The frequency estimator 43 estimates (or calculates) difference $\Delta v$ in optical frequency between the reference light and subcarrier optical signal SCD based on the frequency domain signal generated by the receiver 42. Then, the frequency estimator 43 gives the frequency information representing difference $\Delta v$ to the light source circuit 46.

The demodulator 44 generates a dropped signal by demodulating subcarrier optical signal SCD based on the frequency domain signal generated by the receiver 42. This dropped signal represents the data transmitted by using subcarrier optical signal SCD. Also, this dropped signal is guided to the drive signal generator 45 and a client device. Then, the drive signal generator 45 generates a drive signal based on the inverted signal of the dropped signal. In other words, a drive signal is generated based on the inverted signal of the dropped signal representing the data that has been transmitted by using subcarrier optical signal SCD.

The light source circuit 46 generates continuous wave light CW1 and continuous wave light CW2 in response to the frequency information given from the frequency estimator 43. Continuous wave light CW1 and continuous wave light CW2 have optical frequencies different from that of the reference light and also different from that of the subcarrier multiplexed optical signal. Also, the difference in optical frequency between continuous wave light CW1 and continuous wave light CW2 is $\Delta v$, which is represented by the frequency information. In other words, the difference in optical frequency between continuous wave light CW1 and continuous wave light CW2 is substantially equal to difference $\Delta v$ in optical frequency between the reference light and subcarrier optical signal SCD. Note that it is desirable that the power of continuous wave light CW1 be higher than that of continuous wave light CW2. For example, it is desirable that the power of continuous wave light CW1 be high enough to cause a non-linear effect sufficiently in the non-linear optical medium 48. The optical modulator 47 modulates continuous wave light CW2 in accordance with a drive signal generated by the drive signal generator 45, and thereby generates a modulated optical signal.

To the non-linear optical medium 48, the wavelength multiplexed light guided from the optical splitter 41, continuous wave light CW1 generated by the light source circuit 46 and the modulated optical signal generated by the optical modulator 47 are input. The non-linear optical medium 48 is implemented by for example an optical fiber (particularly a highly non-linear fiber), a high refractive index optical waveguide using silicon, etc. as the core, or a periodically polarized electro-optical crystal. A plurality of optical signals having different optical frequencies enter the non-linear optical medium 48. Accordingly, a non-linear effect (such as four wave mixing, cross-phase modulation, etc.) may occur.

FIG. 8A illustrates a state where probe light, pump light P1 and pump light P2 are input to the non-linear optical medium 48. It is assumed in this example that pump light P1 and pump light P2 each have power that is high sufficiently to cause a non-linear effect in the non-linear optical medium 48. It is also assumed that the difference in optical frequency between the probe light and pump light P1 is $\Delta v$. In such a case, idler light corresponding to the probe light is generated by the four wave mixing. At that moment, the difference in optical frequency between pump light P2 and the idler light is also $\Delta v$. Also, the signal transmitted by the idler light and the signal transmitted by the probe light are identical to each other.

FIG. 8B illustrates a state where the modulated optical signal, continuous wave light CW1 and the wavelength multiplexed light illustrated in FIG. 6 are input to the non-linear optical medium 48. In this example, the modulated optical signal, continuous wave light CW1 and the reference light contained in the wavelength multiplexed light correspond to the probe light, pump light P1 and pump light P2 illustrated in FIG. 8A, respectively. In other words, continuous wave light CW1 and the reference light function as pump light.

In the configuration illustrated in FIG. 6, the difference in optical frequency between the reference light and subcarrier optical signal SCD is $\Delta v$ and the difference in optical frequency between continuous wave light CW1 and the modulated optical signal is also $\Delta v$. In such a case, by the four wave mixing explained by referring to FIG. 8A, idler light corresponding to the modulated optical signal is generated in the optical frequency to which subcarrier optical signal SCD is allocated. In this example, the modulated optical signal is generated based on the inverted signal of subcarrier optical signal SCD. In other words, the idler light generated in the non-linear optical medium 48 represents the inverted signal of subcarrier optical signal SCD. Accordingly, when the idler light corresponding to the modulated optical signal is generated in the non-linear optical medium 48, subcarrier optical signal SCD is cancelled. As a result of this, subcarrier optical signal SCD is removed from the subcarrier multiplexed optical signal.

As described, according to the optical add/drop multiplexer 100 of the first embodiment, an optical signal component of a dropped channel is removed by using non-linear effect. That is, an optical signal is dropped from a subcarrier multiplexed optical signal without using an optical filter etc. Accordingly, even when the spacing between optical signal channels (i.e., the spacing between subcarriers) are narrow, it is possible to accurately drop an optical signal of a specified channel.

In addition to the function of dropping a specified subcarrier optical signal from a subcarrier multiplexed optical signal, the optical add/drop multiplexer 100 has a function of adding a subcarrier optical signal to the subcarrier multiplexed optical signal. In the example illustrated in FIG. 8, a subcarrier optical signal corresponding to a signal received from a client device (referred to as an "added signal" hereinafter) is added to the subcarrier multiplexed optical signal.

In such a case, the drive signal generator 45 generates a drive signal in accordance with the sum of the inverted signal of the dropped signal and the added signal. Also, a modulated optical signal generated in accordance with this drive signal is input to the non-linear optical medium 48.

Accordingly, the idler light generated when the modulated optical signal, continuous wave light CW1 and the wavelength multiplexed light are input to the non-linear optical medium 48 corresponds to the sum of the inverted signal of the dropped signal and the added signal. In this case, as described above, subcarrier optical signal SCD is removed by the idler light in the non-linear optical medium 48. In addition to this, the subcarrier optical signal SCA corresponding to the added signal is inserted to the channel that was occupied by subcarrier optical signal D.

Note that in the optical add/drop multiplexer 100 illustrated in FIG. 6, the frequency estimator 43, the demodulator 44 and the drive signal generator 45 may be implemented by a processor or a circuit that processes a digital signal. When the receiver 42 is implemented by the coherent receiver 21, the A/D convertor 22 and the FFT circuit 23 illustrated in FIG. 3, the FFT circuit 23 may also be implemented by a processor or a circuit that processes a digital signal.

As described above, according to the optical add/drop multiplexer 100 of the first embodiment, adding and dropping of a subcarrier optical signal are implemented by utilizing a difference frequency equivalent to the difference in optical frequency between the reference light and a specified subcarrier optical signal. In this example, the difference frequency is sufficiently lower than the optical frequency of each subcarrier optical signal. Accordingly, it is easy to accurately achieve this difference frequency, making it possible to implement adding and dropping of a subcarrier optical signal highly accurately even when the frequency spacing of subcarriers is narrow.

Figure 9:
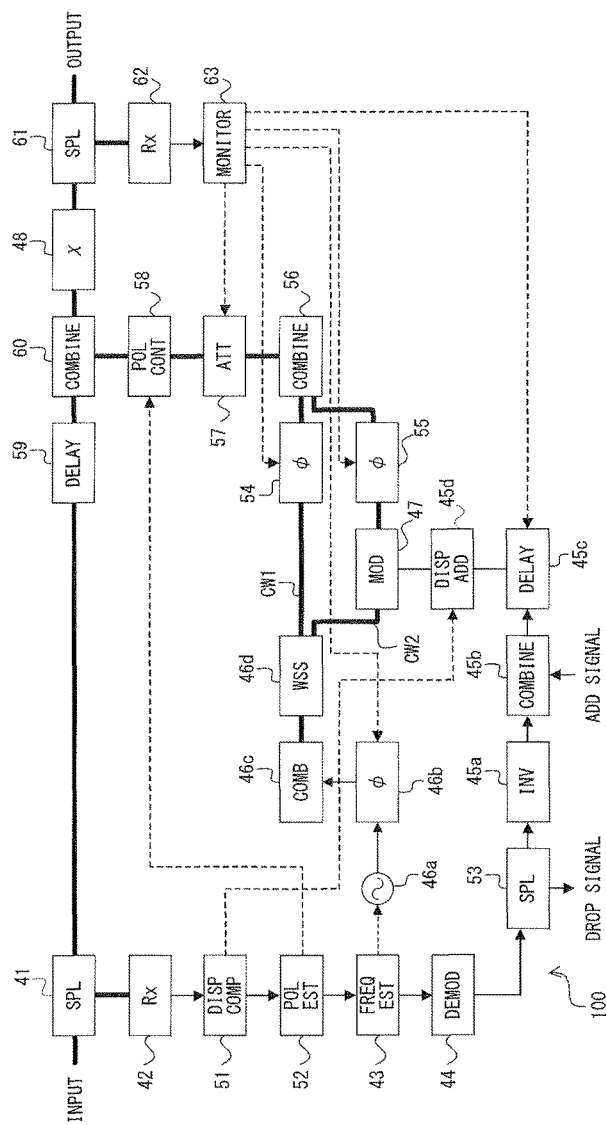
FIG. 9 illustrates an example of the optical add/drop multiplexer according to the first embodiment.

FIG. 9 illustrates an example of the optical add/drop multiplexer 100 according to the first embodiment. Note that the optical splitter (SPL) 41, the receiver (Rx) 42, the frequency estimator (FREQ EST) 43, the demodulator (DEMOD) 44, the optical modulator (MOD) 47 and the nonlinear optical medium ($\chi$) 48 are substantially the same between FIG. 6 and FIG. 9. Also, an inverter (INV) 45a, a combiner 45b, a delay element 45c and a dispersion adder (DISP ADD) 45d correspond to the drive signal generator 45 illustrated in FIG. 6. Further, an oscillator 46a, a phase shifter ($\varphi$) 46b, an optical frequency comb generator (COMB) 46c and a wavelength selective switch (WSS) 46d correspond to the light source circuit 46 illustrated in FIG. 6.

A dispersion compensator (DISP COMP) 51 corrects an electric signal generated by the receiver 42 so that dispersion added to a subcarrier optical signal is compensated for. Then, the dispersion compensator 51 gives dispersion information, which represents the dispersion that is compensated for, to the dispersion adder 45d. The compensation for the dispersion added to a received optical signal may be implemented by a known technique. The dispersion compensator 51 is implemented by for example a digital filter. In such a case, for example tap coefficients of the digital filter are controlled so that the dispersion is reduced. A polarization estimator (POL EST) 52 estimates a polarization state of a subcarrier optical signal based on a signal output from the dispersion compensator 51. Then, the polarization estimator 52 gives polarization information, which represents the estimated polarization state, to a polarization controller (POL CONT) 58. The estimation of the polarization state of a received optical signal may be implemented by a known technique.

The dispersion compensator 51 may compensate for dispersion of a received wavelength multiplexed light. In such a case, the dispersion compensator 51 may be arranged between the coherent receiver and the FFT circuit. Similarly, the polarization estimator 52 may estimate the polarization of a received wavelength multiplexed light. In such a case, the polarization estimator 52 may be arranged between the coherent receiver and the FFT circuit.

A splitter (SPL) 53 guides the dropped signal recovered by the demodulator 44 to the inverter 45a and a client device. The inverter 45a generates an inverted signal of the dropped signal. In the descriptions below, the inverted signal of a dropped signal may be referred to as an inverted dropped signal. Note that when a dropped signal is expressed by I component and Q component, an inverted dropped signal may be generated by for example inverting the phase of a dropped signal on a constellation. When a dropped signal is expressed by "I=Xd, Q=Yd", the inverted dropped signal is expressed by "I=−Xd, Q=−Yd".

The combiner 45b generates the sum of the inverted dropped signal and an added signal. Note that the added signal is for example a data signal to be added to a subcarrier multiplexed optical signal, and is generated by a client device. When the added signal is expressed by "I=Xa, Q=Ya", a signal output from the combiner 45b is expressed by "I=−Xd+Xa, Q=−Yd+Ya".

The delay element 45c delays a signal output from the combiner 45b. A delay time of the delay element 45c is controlled by a monitor circuit 63. The dispersion adder 45d corrects a signal output from the delay element 45c based on the dispersion information given from the dispersion compensator 51. In other words, the dispersion adder 45d adds the dispersion that is compensated for by the dispersion compensator 51 to a signal output from the delay element 45c. Accordingly, the dispersion of a signal output from the dispersion adder 45d is substantially the same as the dispersion of the received optical signal. The signal output from the dispersion adder 45d is fed to the optical modulator 47 as a drive signal. In other words, the optical modulator 47 modulates continuous wave light CW2 in accordance with a drive signal generated by the inverter 45a, the combiner 45b, the delay element 45c and the dispersion adder 45d, and thereby generates a modulated optical signal.

The oscillator 46a generates an oscillation signal having frequency $\Delta v$, which is estimated by the frequency estimator 43, or frequency $\Delta v/m$, where $\Delta v$ represents the difference in optical frequency between the reference light and the subcarrier optical signal SCD, while m represents an integer. Note that a signal output from the oscillator 46a is for example a sine wave. The phase shifter 46b adjusts the phase of a signal output from the oscillator 46a so as to adjust the phase of light output from the optical frequency comb generator 46c. The phase shift amount by the phase shifter 46b is controlled by the monitor circuit 63.

The optical frequency comb generator 46c generates an optical frequency comb having optical frequency different from that of the subcarrier multiplexed optical signal in accordance with the oscillation signal generated by the oscillator 46a. For example, the optical frequency comb generator 46c generates a plurality of continuous wave light beams arranged at prescribed frequency spacing. The wavelength spacing of the plurality of continuous wave light beams is for example $\Delta v$ or $\Delta v/m$. The wavelength selective switch 46d selects continuous wave light CW1 and continuous wave light CW2 from the optical frequency comb generated by the optical frequency comb generator 46c. The optical frequencies of continuous wave light CW1 and continuous wave light CW2 are $v_B$ and $v_B+\Delta v$, respectively. In other words, the difference in optical frequency between continuous wave light CW1 and continuous wave light CW2 is $\Delta v$.

Note that a power of continuous wave light CW1 may be higher than a power of continuous wave light CW2. In such a case, continuous wave light CW1 selected by the wavelength selective switch 46d may be amplified.

An optical phase shifter ($\varphi$) 54 adjusts the optical phase of continuous wave light CW1. The phase shift amount by the optical phase shifter 54 is controlled by the monitor circuit 63. The optical modulator 47 generates a modulated optical signal by modulating continuous wave light CW2 in accordance with the drive signal. An optical phase shifter ($\varphi$) 55 adjusts the optical phase of the modulated optical signal. The phase shift amount by the optical phase shifter 55 is controlled by the monitor circuit 63. Note that while the optical phases of continuous wave light CW1 and the modulated optical signal are adjusted in the example illustrated in FIG. 9, the present invention is not limited to this configuration. For example, a configuration may also be employed in which the optical add/drop multiplexer 100 includes only one of the optical phase shifters 54 and 55.

An optical combiner 56 combines continuous wave light CW1 and the modulated optical signal. In the descriptions below, combined light obtained by combining continuous wave light CW1 and the modulated optical signal may be referred to as a "optical beat signal". An optical attenuator (ATT) 57 adjusts the power of an optical beat signal output from the optical combiner 56. The attenuation amount by the optical attenuator 57 is controlled by the monitor circuit 63. The polarization controller 58 controls the polarization of the optical beat signal based on the estimation information given from the polarization estimator 52. In this situation, the polarization controller 58 controls the polarization of the optical beat signal so that the polarization of the light input to the optical add/drop multiplexer 100 and the polarization of the optical beat signal become substantially the same.

An optical delay line 59 delays wavelength multiplexed light guided from the optical splitter 41 to the non-linear optical medium 48. The delay time caused by the optical delay line 59 is determined based on the time used for the process of demodulating the received optical signal, the process of generating the drive signal, the process of generating the optical beat signal, etc. Specifically, the delay time of the optical delay line 59 may be determined so that the delay time of wavelength multiplexed light guided from the optical splitter 41 to the non-linear optical medium 48 and the processing time used for generating the optical beat signal in accordance with wavelength-division multiplexed optical signal guided from the optical splitter 41 to the receiver 42 become roughly equal to each other. An optical combiner 60 combines the wavelength multiplexed light output from the optical delay line 59 and the optical beat signal output from the polarization controller 58. The wavelength multiplexed light and the optical beat signal are input to the non-linear optical medium 48.

In the non-linear optical medium 48, due to the above non-linear effect, subcarrier optical signal SCD is removed from a subcarrier multiplexed optical signal and a subcarrier optical signal SCA is added to the subcarrier multiplexed optical signal. In other words, dropping and adding of subcarrier optical signals are implemented.

An optical splitter (SPL) 61 splits the wavelength multiplexed light output from the non-linear optical medium 48 so as to guide the branched portion to a receiver (Rx) 62. The configuration and the operations of the receiver 62 are substantially the same as those of the receiver 42. Accordingly, the receiver 62 generates an electric signal that represents a wavelength multiplexed light output from the non-linear optical medium 48.

Based on a signal output from the receiver 62, the monitor circuit 63 monitors the state of the wavelength multiplexed light output from the non-linear optical medium 48. For this monitoring, the monitor circuit 63 monitors the state of the channel from/to which a subcarrier optical signal was dropped/added by using the optical beat signal (referred to as a "target channel" hereinafter). Then, the monitor circuit 63 controls the delay element 45c, the phase shifter 46b, the optical phase shifters 54 and 55 and the optical attenuator 57 based on the monitoring result. For example, the monitor circuit 63 controls the delay element 45c, the phase shifter 46b, the optical phase shifters 54 and 55 and the optical attenuator 57 so that the monitoring result becomes closer to a specified target state. Examples of the control by the monitor circuit 63 are as follows.

Case 1: When subcarrier optical signal SCD is dropped from the target channel and a new subcarrier optical signal is not added to the target channel, the monitor circuit 63 monitors the optical power of the target channel. Then, the monitor circuit 63 controls the delay element 45c, the phase shifter 46b, optical phase shifters 54 and 55 and the optical attenuator 57 so that the optical power of the target channel becomes lower (so that it becomes closer to zero).

Case 2: When subcarrier optical signal SCD is dropped from the target channel and subcarrier optical signal SCA is added to the target channel, the monitor circuit 63 monitors the optical power and the characteristic of the target channel. Then, the monitor circuit 63 controls the delay element 45c, the phase shifter 46b, the optical phase shifters 54 and 55 and the optical attenuator 57 so that the optical power of the target channel becomes roughly the same as the optical power of the other subchannels and that the characteristic of the signal extracted from the target channel (such as the S/N ratio, the error ratio, etc.) exceeds a specified threshold.

By controlling the delay element 45c, the timing error between the wavelength multiplexed light guided from the optical splitter 41 to the non-linear optical medium 48 and the optical beat signal is adjusted. By controlling the phase shifter 46b, the phase of the optical frequency comb generated by the optical frequency comb generator 46c is adjusted. As a result of this, the phase synchronization is adjusted between the wavelength multiplexed light guided from the optical splitter 41 to the non-linear optical medium 48 and the optical beat signal (continuous wave light CW1 and the modulated optical signal). By controlling the optical phase shifters 54 and 55, the phase of continuous wave light CW1 and the phase of the modulated optical signal can be synchronized. By controlling the optical attenuator 57, the optical power of the target channel can be adjusted.

As described above, in the configuration illustrated in FIG. 9, the state of the target channel is optimized because the intensity, phase and delay of signals are adjusted by the feedback control. Thus, the accuracy of dropping and adding of subcarrier optical signals increases. In addition, since an optical beat signal is generated by using an optical frequency comb generator, optical signals can be dropped/added even in a transmission system of a wide band (for example several THz through several tens of THz).

Second Embodiment

In the configuration illustrated in FIG. 9, a new optical signal is added to the channel from which an optical signal was dropped. In other words, an optical signal is dropped from a target channel and a new optical signal is added to that target channel.

By contract, an optical add/drop multiplexer according to a second embodiment can add an optical signal to a desired unoccupied channel. In other words, a channel from which an optical signal is dropped and a channel to which an optical signal is added may be the same and may also be different.

Figure 10:
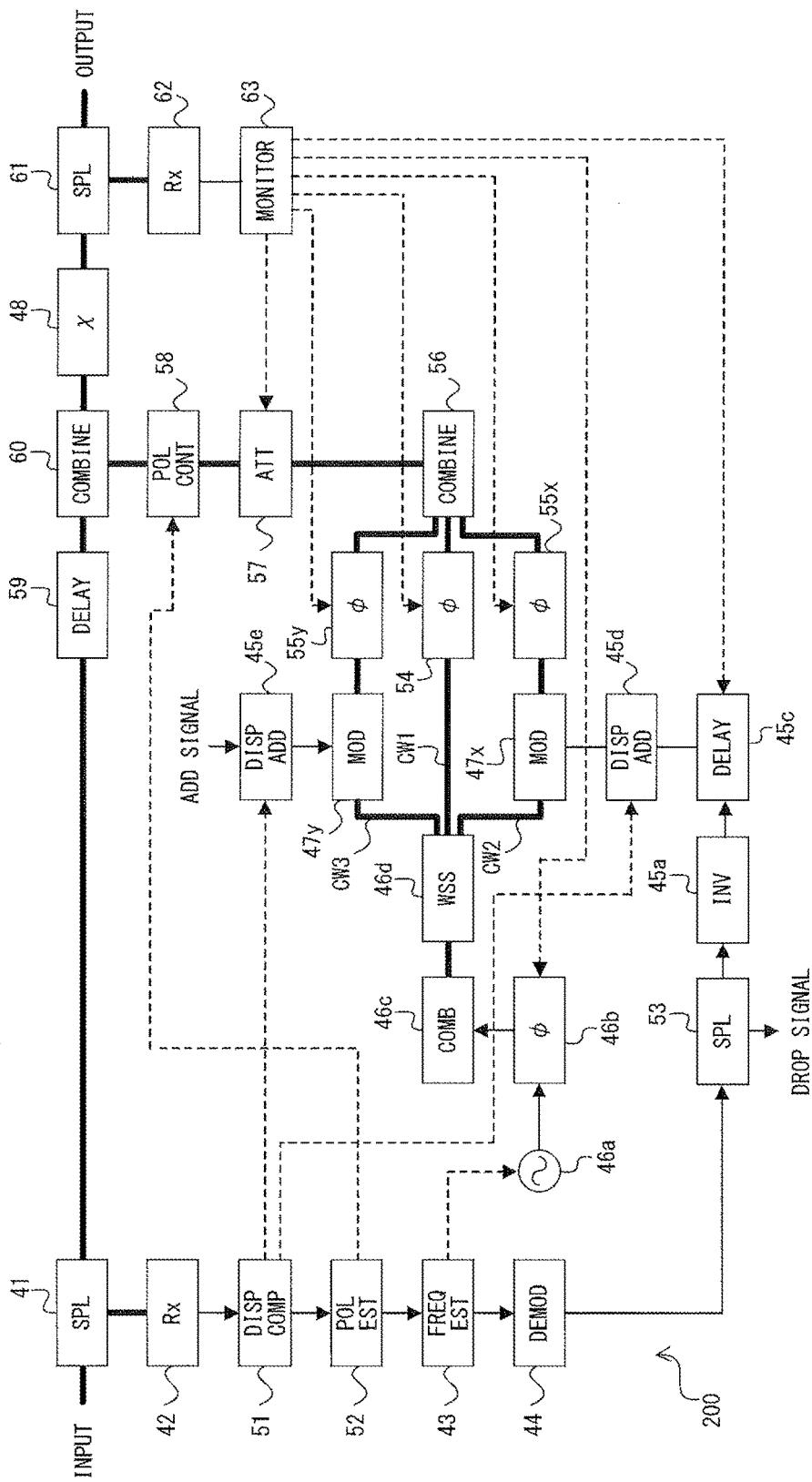
FIG. 10 illustrates an example of an optical add/drop multiplexer according to a second embodiment.

FIG. 10 illustrates an example of an optical add/drop multiplexer 200 according to the second embodiment of the present invention. The optical add/drop multiplexers of the first and second embodiments have similar configurations and the operations. However, the configurations and the operations for generating an optical beat signal are different between the first and second embodiments.

According to the second embodiment, the inverter 45a, the delay element 45c and the dispersion adder 45d generate drive signal D based on a dropped signal. This drive signal D is fed to an optical modulator 47x, which will be described later. Note that drive signal D does not contain an added signal component. An added signal is fed as drive signal A to an optical modulator 47y, which will be described later. When drive signal A is fed to the optical modulator 47y, a dispersion adder 45e adds, to the added signal, dispersion that was compensated for by the dispersion compensator 51.

The wavelength selective switch 46d generates continuous wave light CW1, CW2, and CW3 from the optical frequency comb generated by the light source circuit 46. Continuous wave light CW1 and continuous wave light CW2 are the same as those in the first embodiment. In other words, the difference in optical frequency between continuous wave light CW1 and continuous wave light CW2 is identical to the difference in optical frequency between the reference light and subcarrier optical signal SCD that is to be dropped from the subcarrier multiplexed optical signal.

Also, the difference in optical frequency between continuous wave light CW1 and continuous wave light CW3 is identical to the difference in optical frequency between the reference light and the channel to which the added signal is to be added to the subcarrier multiplexed optical signal.

The optical modulator 47x modulates continuous wave light CW2 in accordance with drive signal D generated by the inverter 45a, the delay element 45c and the dispersion adder 45d to generate modulated optical signal D. Similarly, the optical modulator 47y modulates continuous wave light CW3 in accordance with drive signal A output from the dispersion adder 45e to generate modulated optical signal A. An optical phase shifter 55x and an optical phase shifter 55y respectively adjust the phases of modulated optical signals D and A in accordance with the control by the monitor circuit 63.

The optical combiner 56 generates an optical beat signal by combining continuous wave light CW1, modulated optical signal D and modulated optical signal A. This optical beat signal is guided to the non-linear optical medium 48 via the optical attenuator 57, the polarization controller 58 and the optical combiner 60. In other words, the wavelength multiplexed light containing the reference light and the subcarrier multiplexed optical signal, continuous wave light CW1, modulated optical signal D and modulated optical signal A are input to the non-linear optical medium 48.

FIG. 11A illustrates a state where probe light 1, probe light 2, pump light P1 and pump light P2 are input to the non-linear optical medium 48. It is assumed in this example that pump light P1 and pump light P2 each have power that is high sufficiently to cause anon-linear effect in the non-linear optical medium 48. It is also assumed that the difference in optical frequency between the probe light 1 and pump light P1 is $\Delta v1$ and that the difference in optical frequency between probe light 2 and pump light P1 is $\Delta v2$. In such a case, by the four wave mixing, idler light 1 corresponding to probe light 1 is generated and idler light 2 corresponding to probe light 2 is generated by the four wave mixing. At that moment, the difference in optical frequency between pump light P2 and idler light 1 is also $\Delta v1$ and the difference in optical frequency between pump light P2 and idler light 2 is $\Delta v2$. Also, the signal transmitted by idler light 1 and the signal transmitted by probe light 1 are identical to each other, and the signal transmitted by idler light 2 and the signal transmitted by probe light 2 are identical to each other.

FIG. 11B illustrates a state where modulated optical signal D, modulated optical signal A, continuous wave light CW1 and the wavelength multiplexed light illustrated in FIG. 10 are input to the non-linear optical medium 48. In this example, modulated optical signal D, modulated optical signal A, continuous wave light CW1 and the reference light contained in the wavelength multiplexed light correspond to probe light 1, probe light 2, pump light P1 and pump light P2 illustrated in FIG. 11A, respectively. In other words, continuous wave light CW1 and the reference light function as pump light.

In this example, the difference in optical frequency between the reference light and channel D illustrated in FIG. 11B is $\Delta v1$, and the difference in optical frequency between continuous wave light CW1 and modulated optical signal D is also $\Delta v1$. In such a case, by the four wave mixing explained by referring to FIG. 11A, idler light 1 corresponding to modulated optical signal D is generated in the optical frequency to which channel D is allocated. In this example, modulated optical signal D is generated in accordance with drive signal D, which represents the inverted signal of subcarrier optical signal SCD. In other words, idler light 1 generated in the non-linear optical medium 48 represents the inverted signal of subcarrier optical signal SCD. Accordingly, when idler light 1 corresponding to modulated optical signal D is generated in the non-linear optical medium 48, subcarrier optical signal SCD that occupies channel D is cancelled.

Also, the difference in optical frequency between the reference light and channel A illustrated in FIG. 11B is $\Delta v2$, and the difference in optical frequency between continuous wave light CW1 and modulated optical signal A is also $\Delta v2$. In such a case, idler light 2 corresponding to modulated optical signal A is generated in the optical frequency to which channel A is allocated. In this example, modulated optical signal A is generated in accordance with drive signal A, which represents the added signal. Accordingly, when idler light 2 corresponding to modulated optical signal A is generated in the non-linear optical medium 48, subcarrier optical signal SCA is added to channel A. In other words, a subcarrier multiplexed optical signal from which subcarrier optical signal SCD is removed and to which subcarrier optical signal SCA is added is generated.

Third Embodiment

In the first and second embodiments, an optical beat signal is generated based on a dropped signal and an added signal and that optical beat signal is input to a non-linear optical medium so that the dropping and the adding of optical signals are implemented. In an optical add/drop multiplexer according to a third embodiment, the dropping and the adding of optical signals are implemented based on an operation different from those in the first and second embodiments.

Figure 12:
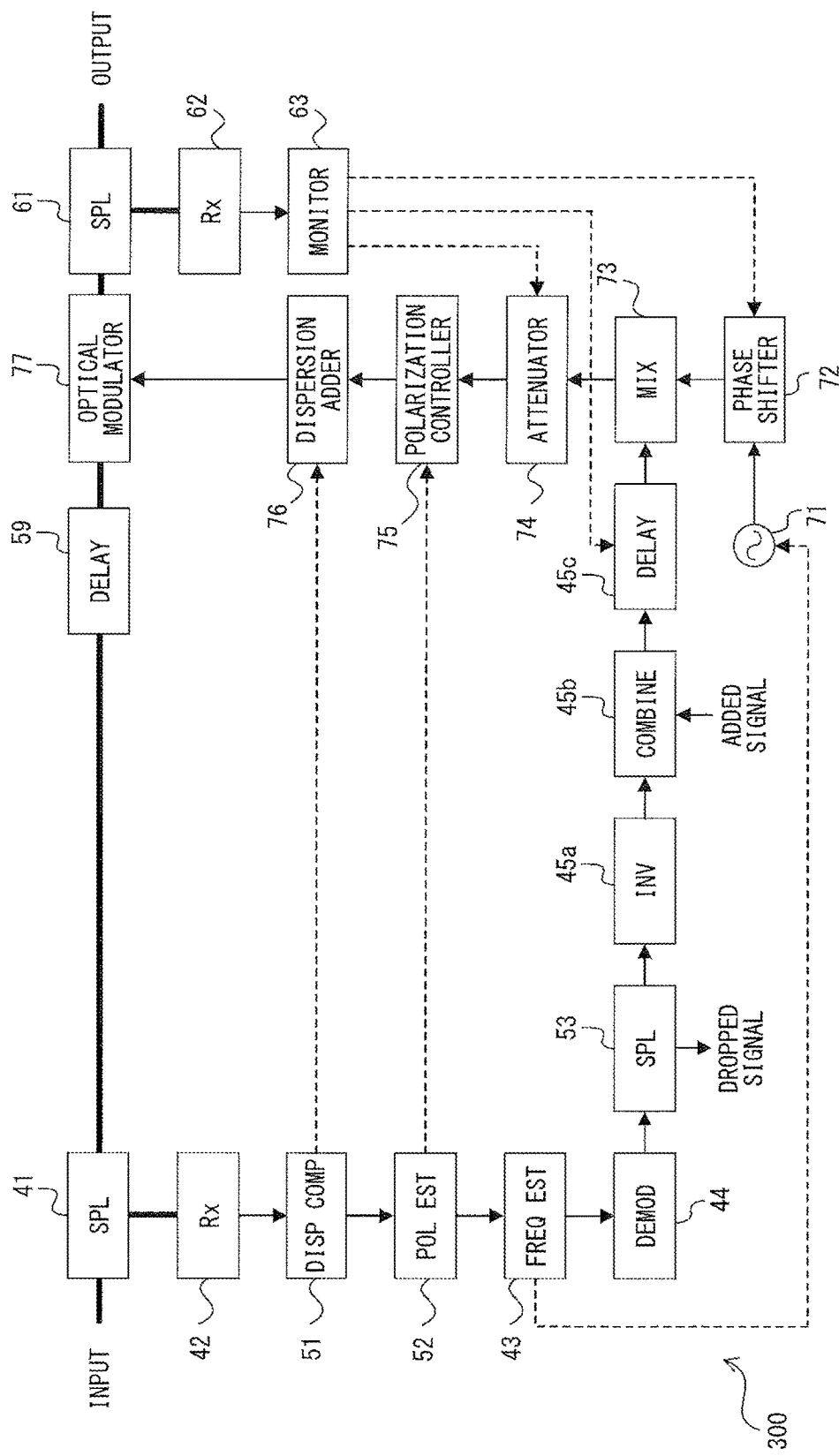
FIG. 12 illustrates an example of an optical add/drop multiplexer according to a third embodiment.

FIG. 12 illustrates an example of an optical add/drop multiplexer 300 according to the third embodiment of the present invention. The configuration for demodulating a received subcarrier multiplexed optical signal (the receiver 42, the dispersion compensator 51, the polarization estimator 52, the frequency estimator 43 and the demodulator 44) is substantially the same in the first and third embodiments.

An oscillator 71 outputs an oscillation signal in accordance with frequency information given from the frequency estimator 43. In this example, frequency information represents difference $\Delta v$ in optical frequency between the reference light and a dropped subcarrier optical signal SCD. The oscillator 71 outputs an oscillation signal of frequency $\Delta v$. In such a case, the oscillation signal is expressed by $\cos(2\pi\Delta vt)$. A phase shifter 72 adjusts the phase of the oscillation signal output from the oscillator 71. The phase shift amount by the phase shifter 72 is controlled by the monitor circuit 63.

A mixer 73 mixes the oscillation signal adjusted by the phase shifter 72 and a drive signal output from the delay element 45c. This drive signal is generated based on an inverted dropped signal and an added signal. Accordingly, a signal output from the mixer 73 can be expressed by the formula below.

$$(B_A - B_D)\cos(2\pi\Delta vt)$$

$B_D$ represents a dropped signal. Thus, $-B_D$ represents an inverted dropped signal. $B_A$ represents an added signal. In the descriptions below, a signal output from the mixer 73 may be referred to as a "substitute signal".

An attenuator 74 adjusts the amplitude of the substitute signal. The attenuation amount by the attenuator 74 is controlled by the monitor circuit 63. A polarization controller 75 controls the polarization state of the substitute signal in the electric domain in accordance with the state of the polarization estimated by the polarization estimator 52. A dispersion adder 76 adds, to the substitute signal, the dispersion compensated for by the dispersion compensator 51 in the electric domain.

The wavelength multiplexed light, that is guided from the optical splitter 41 via the optical delay line 59, is input to an optical modulator 77. Then, the optical modulator 77 modulates the wavelength multiplexed light based on the substitute signal. By this modulation, "$B_A-B_D$" is generated in the optical frequency that is shifted from the reference light by $\Delta v$. Accordingly, in a subcarrier multiplexed optical signal, subcarrier optical signal SCD corresponding to the dropped signal is removed and subcarrier optical signal SCA corresponding to the added signal is inserted.

In the example illustrated in FIG. 12, an optical signal is dropped from a channel and another optical signal is added to the same channel, however, the third embodiment is not limited to this configuration. That is, the optical add/drop multiplexer according to the third embodiment may add an optical signal to an arbitrary unoccupied channel.

Fourth Embodiment

An optical add/drop multiplexer according to a fourth embodiment has a configuration similar to that of the optical add/drop multiplexer according to the third embodiment. Accordingly, differences between the third and the fourth embodiments will be described below.

FIG. 13 illustrates an example of an optical add/drop multiplexer 400 according to the fourth embodiment of the present invention. In the optical add/drop multiplexer 400 according to the fourth embodiment, a CW light source 81 generates continuous wave light. An optical frequency of the continuous wave light is different from that of the subcarrier multiplexed optical signal. An optical modulator 82 drives continuous wave light generated by the CW light source 81 based on a substitute signal to generate a modulated optical signal. A substitute signal is generated by mixing an oscillation signal generated by the oscillator 71 and the sum of an inverted dropped signal and an added signal similarly to the third embodiment.

The modulated optical signal generated by the optical modulator 82 is guided to the non-linear optical medium 48 by the optical combiner 60. In other words, wavelength multiplexed light and the modulated optical signal are input to the non-linear optical medium 48. The wavelength multiplexed light contains reference light and subcarrier multiplexed optical signal illustrated in FIG. 8B. Also, the continuous wave light generated by the CW light source 81 is assumed to be equivalent to CW1 illustrated in FIG. 8B. Further, the modulated optical signal is generated by utilizing an oscillation signal of frequency $\Delta v$. Accordingly, also in the fourth embodiment, subcarrier optical signal SCD is removed from a subcarrier multiplexed optical signal and subcarrier optical signal SCA is added to the subcarrier multiplexed optical signal due to an effect similar to that illustrated in FIG. 8B.

In the example illustrated in FIG. 13, an optical signal is dropped from a channel and another optical signal is added to the same channel, however, the fourth embodiment is not limited to this configuration. That is, the optical add/drop multiplexer according to the fourth embodiment may add an optical signal to an arbitrary unoccupied channel.

Another Embodiment

In the above examples, the optical add/drop multiplexer processes a subcarrier multiplexed optical signal in which a plurality of subcarrier optical signals are multiplexed. In other words, in the above examples, a subcarrier optical signal is dropped from a subcarrier multiplexed optical signal and another subcarrier optical signal is added to the subcarrier multiplexed optical signal.

The present invention is not limited to the above configurations. As a specific example, an optical signal of a specified wavelength may be dropped from a WDM optical signal, and an optical signal of a specified wavelength may be added to the WDM optical signal. However, in this case, it is preferable that the phases of the respective wavelength channels of the WDM optical signal are synchronized.

Note that when a subcarrier multiplexed optical signal is generated by modulating continuous wave light output from one laser light source, the phases of a plurality of subcarrier optical signals multiplexed in the subcarrier multiplexed optical signal are synchronized. Accordingly, a subcarrier multiplexed optical signal is an example of a wavelength multiplexed light signal having synchronized phases.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical add/drop multiplexer that processes wavelength multiplexed light containing reference light and a wavelength-division multiplexed optical signal in which a plurality of optical signals are multiplexed, the optical add/drop multiplexer comprising:
    an optical splitter that splits the wavelength multiplexed light to generate first wavelength multiplexed light and second wavelength multiplexed light;
    a receiver that generates an electric signal representing the second wavelength multiplexed light;
    a frequency estimator that estimates a difference in optical frequency between the reference light and an optical signal specified from among the plurality of optical signals multiplexed in the wavelength-division multiplexed optical signal, based on the electric signal generated by the receiver;
    a light source that generates first light and second light, an optical frequency of the second light being shifted by the estimated difference with respect to an optical frequency of the first light;
    a demodulator that generates a dropped signal representing the specified optical signal based on the electric signal;
    a drive signal generator that generates a drive signal in accordance with an inverted signal of the dropped signal;
    an optical modulator that modulates the second light in accordance with the drive signal to generate a modulated optical signal; and
    a non-linear optical medium to which the first wavelength multiplexed light, the first light and the modulated optical signal are input.

2. The optical add/drop multiplexer according to claim 1, wherein the drive signal generator generates the drive signal in accordance with a sum of the inverted signal of the dropped signal and an added signal.

3. The optical add/drop multiplexer according to claim 1, further comprising:
a dispersion compensator that corrects the electric signal so that dispersion of the wavelength multiplexed light is compensated for; and
a dispersion adder configured to correct the drive signal so that dispersion compensated for by the dispersion compensator is added to the modulated optical signal.

4. The optical add/drop multiplexer according to claim 1, further comprising:
a polarization estimator that estimates a polarization state of the wavelength multiplexed light; and
a polarization controller that controls the modulated optical signal so that a polarization state of the modulated optical signal is substantially identical to the polarization state estimated by the polarization estimator.

5. The optical add/drop multiplexer according to claim 1, further comprising:
a monitor circuit that monitors a state of light output from the non-linear optical medium; and
a delay element that delays the drive signal, wherein the monitor circuit controls a delay time of the delay element based on a state of light output from the non-linear optical medium.

6. The optical add/drop multiplexer according to claim 1, further comprising:
a monitor circuit that monitors a state of light output from the non-linear optical medium; and
a phase shifter that adjusts a phase of light output from the light source, wherein
the monitor circuit controls a phase shift amount of the phase shifter based on a state of light output from the non-linear optical medium.

7. The optical add/drop multiplexer according to claim 1, further comprising:
a monitor circuit that monitors a state of light output from the non-linear optical medium; and
an optical phase shifter that adjusts a phase of the modulated optical signal with respect to a phase of the first light, wherein
the monitor circuit controls the phase shift amount of the optical phase shifter based on a state of light output from the non-linear optical medium.

8. The optical add/drop multiplexer according to claim 1, further comprising:
a monitor circuit that monitors a state of light output from the non-linear optical medium; and
an optical attenuator that adjusts power of the first light and the modulated optical signal, wherein
the monitor circuit controls an attenuation amount of the optical attenuator based on a state of light output from the non-linear optical medium.

9. An optical add/drop multiplexer that processes wavelength multiplexed light containing reference light and a wavelength-division multiplexed optical signal in which a plurality of optical signals are multiplexed, the optical add/drop multiplexer comprising:
an optical splitter that splits the wavelength multiplexed light to generate first wavelength multiplexed light and second wavelength multiplexed light;
a receiver that generates an electric signal representing the second wavelength multiplexed light;
a frequency estimator that estimates a difference frequency between an optical frequency of the reference light and an optical frequency of an optical signal specified from among the plurality of optical signals multiplexed in the wavelength-division multiplexed optical signal, based on the electric signal generated by the receiver;
a demodulator that generates a dropped signal representing the specified optical signal based on the electric signal;
an oscillator that generates an oscillation signal of the estimated difference frequency;
a drive signal generator that generates a drive signal in accordance with an inverted signal of the dropped signal and the oscillation signal; and
an optical modulator that modulates the first wavelength multiplexed light in accordance with the drive signal to generate an output wavelength-division multiplexed optical signal.

10. An optical add/drop multiplexer that processes wavelength multiplexed light containing reference light and a wavelength-division multiplexed optical signal in which a plurality of optical signals are multiplexed, the optical add/drop multiplexer comprising:
an optical splitter that splits the wavelength multiplexed light to generate first wavelength multiplexed light and second wavelength multiplexed light;
a receiver that generates an electric signal representing the second wavelength multiplexed light;
a frequency estimator that estimates a difference frequency between an optical frequency of the reference light and an optical frequency of an optical signal specified from among the plurality of optical signals multiplexed in the wavelength-division multiplexed optical signal, based on the electric signal generated by the receiver;
a demodulator that generates a dropped signal representing the specified optical signal based on the electric signal;
an oscillator that generates an oscillation signal of the estimated difference frequency;
a drive signal generator that generates a drive signal in accordance with an inverted signal of the dropped signal and the oscillation signal;
a light source that generates continuous wave light having an optical frequency different from that of the wavelength-division multiplexed optical signal;
an optical modulator that modulates the continuous wave light in accordance with the drive signal to generate a modulated optical signal; and
a non-linear optical medium to which the first wavelength multiplexed light and the modulated optical signal are input.

11. An optical signal add/drop method that processes wavelength multiplexed light containing reference light and a wavelength-division multiplexed optical signal in which a plurality of optical signals are multiplexed, the method comprising:
splitting the wavelength multiplexed light to generate first wavelength multiplexed light and second wavelength multiplexed light;
generating an electric signal representing the second wavelength multiplexed light;
estimating a difference in optical frequency between the reference light and an optical signal specified from among the plurality of optical signals multiplexed in the wavelength-division multiplexed optical signal, based on the electric signal;

generating first light and second light, an optical frequency of the second light being shifted by the estimated difference with respect to an optical frequency of the first light;

generating a dropped signal representing the specified optical signal based on the electric signal;

generating a drive signal in accordance with an inverted signal of the dropped signal;

modulating the second light in accordance with the drive signal to generate a modulated optical signal; and inputting the first wavelength multiplexed light, the first light and the modulated optical signal to a non-linear optical medium.

12. The method according to claim 11, wherein
the drive signal is generated in accordance with a sum of the inverted signal of the dropped signal and an added signal.

* * * * *